(12) United States Patent
Abe et al.

(10) Patent No.: US 8,202,429 B2
(45) Date of Patent: Jun. 19, 2012

(54) METHOD FOR RECOVERING A USED SLURRY

(75) Inventors: Mitsugu Abe, Atsugi (JP); Masamitsu Iiyama, Atsugi (JP)

(73) Assignee: Nomura Micro Science Co., Ltd., Atsugi-shi (JP)

( * ) Notice: Subject to any disclaimer, the term of this patent is extended or adjusted under 35 U.S.C. 154(b) by 174 days.

(21) Appl. No.: 12/539,862

(22) Filed: Aug. 12, 2009

(65) Prior Publication Data

US 2010/0163487 A1 Jul. 1, 2010

(30) Foreign Application Priority Data

Dec. 26, 2008 (JP) ................................. 2008-335317
Jun. 22, 2009 (JP) ................................. 2009-147163

(51) Int. Cl.
*B01D 61/00* (2006.01)
*B08B 7/04* (2006.01)
*C02F 9/00* (2006.01)

(52) U.S. Cl. ..... 210/652; 210/651; 210/650; 210/195.2; 134/10

(58) Field of Classification Search .......... 210/650–652, 210/663, 767, 195.2; 134/10
See application file for complete search history.

(56) References Cited

U.S. PATENT DOCUMENTS

| | | | | |
|---|---|---|---|---|
| 4,276,176 A | * | 6/1981 | Shorr | 210/637 |
| 5,647,989 A | * | 7/1997 | Hayashi et al. | 210/641 |
| 5,772,900 A | * | 6/1998 | Yorita et al. | 210/805 |
| 5,871,648 A | * | 2/1999 | Allen et al. | 210/638 |
| 5,958,288 A | | 9/1999 | Mueller et al. | |
| 5,965,027 A | * | 10/1999 | Allen et al. | 210/638 |
| 5,980,775 A | | 11/1999 | Grumbine et al. | |
| 6,015,506 A | | 1/2000 | Streinz et al. | |
| 6,068,787 A | | 5/2000 | Grumbine et al. | |
| 6,077,437 A | * | 6/2000 | Hayashi et al. | 210/651 |
| 6,083,419 A | | 7/2000 | Grumbine et al. | |
| 6,106,728 A | | 8/2000 | Iida et al. | |
| 6,136,711 A | | 10/2000 | Grumbine et al. | |
| 6,203,705 B1 | * | 3/2001 | James et al. | 210/638 |
| 6,379,538 B1 | * | 4/2002 | Corlett et al. | 210/96.1 |
| 6,482,325 B1 | * | 11/2002 | Corlett et al. | 210/662 |
| 6,592,776 B1 | | 7/2003 | Wang et al. | |
| 6,767,476 B2 | | 7/2004 | Wang et al. | |
| 6,866,784 B2 | * | 3/2005 | Chang et al. | 210/652 |
| 7,722,841 B2 | * | 5/2010 | Kawawa et al. | 423/42 |
| 7,981,295 B2 | * | 7/2011 | Al-Samadi | 210/652 |

FOREIGN PATENT DOCUMENTS

| | | | |
|---|---|---|---|
| EP | 0 798 079 B1 | | 10/1997 |
| JP | 9-314466 A | | 12/1997 |
| JP | 10-265766 A | | 10/1998 |
| JP | 11-10540 A | | 1/1999 |
| JP | 11-116948 A | | 4/1999 |
| JP | 2003-74581 A | | 3/2003 |
| JP | 2005-04102 | * | 2/2005 |
| JP | 2006-086144 | * | 3/2006 |

* cited by examiner

Primary Examiner — Ana Fortuna
(74) Attorney, Agent, or Firm — Foley & Lardner LLP

(57) ABSTRACT

Foreign substances which are not inherently contained in a polishing slurry are selectively separated and removed from a polishing slurry component comprised of abrasives, a solvent and an additive which are inherently contained in the polishing slurry.

3 Claims, 3 Drawing Sheets

METHOD FOR RECOVERING A USED SLURRY

CROSS-REFERENCE TO RELATED APPLICATIONS

This application is based upon and claims the benefit of priorities from the prior Japanese Patent Application No. 2008-335317 filed on Dec. 26, 2008 and Japanese Patent Application No. 2009-147163 filed on Jun. 22, 2009; the entire contents which are incorporated herein by reference.

BACKGROUND

1. Field of the Invention

The present invention relates to a method for recovering a semiconductor polishing slurry (hereinafter, often called as "polishing slurry") which would be used in a polishing step in a manufacturing process of semiconductor, and particularly to a method for recovering a used semiconductor polishing slurry with active elements such as abrasives and (an) additive (s) which are dissolved in the dispersion medium of the used slurry, whereby the abrasives and the additive(s) can be recovered with no additional addition of the abrasives, the additive agent(s) for repeating the polishing step.

The manufacturing process of semiconductor includes the steps of forming a base material such as a wafer and a glass directed at a liquid crystal substrate and a mask, forming a manufacturing apparatus member, and manufacturing a device such as an element or a pattern through the processing of the base material and the like.

2. Background of the Invention

Recently, with the development of speedup of a personal computer, it is required for semiconductor integrated circuits ("IC"s) to be employed for the personal computer to be integrated in higher density. In order to comply with the requirement of the higher density integration of the ICs, the wiring patterns must be miniaturized while a multilayered structure must be employed.

In the employment of the multilayered structure, it is required that the surface roughness for the wafer as a base and each layer of the multilayered structure is reduced than ever so that the deterioration of the step coverage at steps and the fluctuation in coating thickness of a photoresist can be reduced.

In this point of view, the surface of the wafer as the base and the surface of each layer of the multilayered structure are polished by using a polishing slurry in order to remove the surface unevenness of each layer thereof.

In the formation of contact holes and via holes by means of CVD (chemical vapor deposition) using tungsten and the formation of a damascene structure by embedding the wiring trenches with Cu wirings, the thus obtained tungsten film and the thus obtained Cu film are polished by using the polishing slurry until the surface levels of the tungsten film and the Cu film become almost equal to the surface level of an insulating film formed around the hole areas and the damascene structure area while the tungsten film and the Cu film are left at the hole areas and the damascene structure area.

In the polishing step in the semiconductor manufacturing process, the surface of the wafer attached to a spindle is contacted with a polishing pad provided on a rotation table with supplying the polishing slurry to the contact area between the wafer and the polishing pad while driving the rotation table.

As the polishing slurry used in the semiconductor manufacturing process, such a polishing slurry as having a composition of polishing member as fumed silica and an ultrapure water, as occasion demands, with an additive element as an iron salt and an organic component, the polishing member and the additive element being dispersed in the ultrapure water.

In the case where such a polishing slurry as having a composition as described above is employed in the semiconductor polishing step, the polishing slurry contains a specific kind of metallic ion commensurate with the composition of the substance to be polished and is fed in a container. After the polishing step is completed, the polishing slurry and the polishing scraps remaining on the polishing pad are washed with the ultrapure water and then, fed in the container.

In Reference 1, the excess water of the used polishing slurry contained in the container is removed via a filter so that the concentration of the used polishing slurry is controlled. Then, the ions are removed from the used polishing slurry via an ion-exchange resin or the like, and the short components are compensated in reference to the composition of the original polishing slurry, and large particles such as polishing scraps are removed via a particle-size controlling filter. In this way, the used polishing slurry is recovered.

[Reference 1] JP-A 11-010540 (KOKAI)
[Reference 2] JP-A 9-314466 (KOKAI)

By the way, since the used polishing slurry contained in the container includes a large amount of washing water as described above, first of all, the excess water must be removed from the used polishing slurry in the recovering process thereof. In this case, an additive such as a stabilizer, a catalyst, a pH controlling component and the like, which are water-soluble and contained in the original polishing slurry, are removed with the excess water, so that the polishing slurry is wasted and another treatment may be required when one or more of the components removed with the excess water are regulated in disposal. In the latter case, it costs to conduct the additional treatment.

BRIEF SUMMARY OF THE INVENTION

It is an object of the present invention, in view of the conventional problems, to provide a method for recovering a used polishing slurry, whereby the effective components contained in the dispersion medium of the used polishing slurry.

In order to achieve the above object, the present invention relates to a method for recovering a used slurry, including a step of selectively separating and removing foreign substances which are not inherently contained in a polishing slurry from a polishing slurry component comprised of abrasives, a solvent and an additive which are inherently contained in the polishing slurry.

In an aspect of the present invention, the step includes a first step of selectively separating and removing the foreign substances from the polishing slurry component with at least one selected from the group consisting of a microfiltration membrane, an ultrafilter membrane and a reverse osmosis membrane.

In another aspect of the present invention, the step includes a second step of selectively separating and removing the foreign substances from the polishing slurry component with at least one of an ion exchanger and a chelate forming material.

In still another aspect of the present invention, the foreign substances includes at least one selected from the group consisting of a liquid originated from a washing liquid for a substance to be polished, a metallic component originated from the substance to be polished, large particles originated from a polishing pad and a dresser for conditioning the polishing pad, and abrasive aggregates.

The recovering method of the polishing slurry according to the present invention includes concretely the following steps: a used slurry concentrating step for treating and concentrating the used semiconductor polishing slurry diluted with a washing water via a microfiltration membrane such as a ceramic filter or an ultrafilter membrane; a filtrate concentrating step for treating and concentrating a filtrate generated at the used slurry concentrating step; a metallic component-removing step for removing metallic components contained in the filtrate through the contact of the filtrate concentrated at the filtrate concentrating step with an ion-exchanger or a chelate forming material; a semiconductor polishing slurry controlling step for mixing the filtrate from which the metallic components are removed at the metallic component-removing step with the filtrate concentrated at the used slurry concentrating step to control the concentration of the used slurry mixed; and solid foreign substance filtering step for separating and removing solid foreign substances such as pad scraps via a microfiltration membrane or an ultrafilter membrane.

In the present invention, the polishing slurry intends a polishing slurry disclosed in JP-A 10-265766 (KOKAI) or JP-A 11-116948 (KOKAI), for example. Such a polishing slurry as containing fumed silica particles with a particle distribution of 0.02 μm or more and a median size (volume standard) of about 0.15 μm, an effective component such as ferric nitrate, organic acid or amino acid and a water may be exemplified. The silica particles and the effective component are dispersed and dissolved in the water.

The composition of the polishing slurry before the polishing step is exemplified as follow:

Specific gravity: 1.03
pH: 2.0 to 2.2
Average particle size (μm): 0.14 to 0.15
W concentration [ppm]<10
Fe concentration [ppm]<60
Ti concentration [ppm]<0.1
B concentration [ppm]<0.2
Na concentration [ppm]<0.1
Mg concentration [ppm]<0.6
Al concentration [ppm]<0.1
K concentration [ppm]<0.1
Ca concentration [ppm]<0.1
Mn concentration [ppm]<0.1
Cr concentration [ppm]<0.1
Ni concentration [ppm]<0.1
Cu concentration [ppm]<0.5
Zn concentration [ppm]<0.1
Pb concentration [ppm]<1
Co concentration [ppm]<0.1
Zr concentration [ppm]<0.1
Cr concentration [ppm]<10
TOC concentration [ppm] 160 to 230

When the exemplified polishing slurry is used in the polishing step, the concentration of a specific metallic ion is increased commensurate with the composition of the substance to be polished and when the exemplified polishing slurry is contained in the container, the total concentration of the polishing slurry is decreased by the dilution with the washing water because the washing water is contained simultaneously in the container.

The microfiltration membrane such as a ceramic filter or the ultrafilter membrane at the used polishing slurry concentrating step may be set to the one commercially available.

For example, as the ceramic filter, a ceramic filter with a pore diameter of about 0.05 μm may be exemplified. When the used polishing slurry is passed through the ceramic filter, the water of the polishing slurry and one or more of the components dissolved in the polishing slurry are passed through the pores of the ceramic filter and thus, removed. As a result, the relative density of the polishing slurry is increased to 1.033 from 1.003.

As the reverse osmosis membrane to be used at the filtrate concentrating step, a reverse osmosis membrane commercially available may be exemplified.

For example, a reverse osmosis membrane made of polyamide-based composite film and having a salt stopping ratio of 90% or more may be used. In this case, the additive components of the polishing slurry in the thus obtained concentrated liquid are concentrated and then, the polishing slurry can be recovered by transferring the concentrated liquid into the container with no re-addition of the additive components. As occasion demands, nitric acid may be added into the container such that the pH of the recovered polishing slurry can be finely controlled.

The ion-exchanger or chelate forming material to be employed at the metallic component removing step may be made as follows. An element capable of realizing ion exchange or forming metallic chelate is fixed at a powdery, particulate, filmy or fibrous base to form the ion-exchanger or the chelate forming material. Particularly, since the chelate forming material made by fixing a function with metallic chelate forming ability at the fibrous base has a high contacting efficiency for metallic ions, the chelate forming material has a high trapping rate for the metallic ions.

As the function with the metallic chelate forming ability, aminocarboxylate-based function (including aminopolycarboxylate-based function), amine-based function, hydroxylamine-based function, phosphoric acid-based function and thio compound-based function are preferable. Among the aminocarboxylate-based function, iminoacetic acid and aminoacetic acid may be exemplified as amino monocarboxylate. Moreover, nitrilotriacetic acid, ethylene diamine tetra-acetic acid, diethylene triamine-pentaacetic acid, triethylene tetramine-tetraacetic acid, glutamate-diaccetic acid, ethylene diamine disuccinic acid or iminodiacetic acid may be exemplified as aminopolycarboxylate. Ethylenediamine, diethylenetriamine, triethylenetetraamine, polyethylene-polyamine, polyethyleneamine, polyethyleneimine, polyallylamine, pyrrole, polyvinylamine, Schiff base may be exemplified as the amine-based function. Oxime, amidoxime, oxine (8-oxyquinoline), glucamine, dihydroxyethylamine, hydroxamic acid may be exemplified as the hydroxylamine-based function. Aminophosphoric acid and phosphoric acid may be exemplified as the phosphoric acid-based function. Thiol, thiocarboxylic acid, dithiocarbamic acid and thiourea may be exemplified as the thio compound-based function.

The fibrous base with the chelate forming ability may be made of any polymeric material only if the polymeric material can be processed in fiber form and contain the function with the chelate forming ability. Insofar as the above-requirement is satisfied, one or more polymeric material may be utilized. Cellulose, polyvinyl alcohol, polyethyleneimine, polyester, polyvinyl chloride, polyacrylonitrile, polyamide and polyolefin may be exemplified as the polymetric material.

The polymeric material may be shaped in long-fiber monofilament form, multifilament form, short fiber spun yarn form, woven fabric form or non-woven fabric form. Two or more kinds of polymeric materials may be employed. In this case, the composite polymeric materials may be shaped in the above-described form. In view of the contacting efficiency with the metallic ions, the diameter of the fiber (long fiber) may be preferably set within a range of 1 to 500 μm, more preferably within a range of 5 to 200 μm. The length of the fiber (long fiber) may be preferably set to 10 mm or more.

In order to enhance the contacting efficiency with the filtrate to be treated, a short fiber base as exemplified above may be effectively employed. In this case, the length of the short fiber may be preferably set within a range of 0.05 to 10 mm, more preferably within a range of 0.1 to 3 mm. The diameter of the short fiber may be preferably set within a range of 1 to 500 μm, more preferably within a range of 5 to 200 μm. The aspect ratio of the short fiber is preferably set within a range of 1.1 to 600, more preferably within a range of 1.5 to 100. A long fiber of a length of 5 mm or more may be combined with the short fiber.

The long fiber material can be easily processed in sheet form or felt form. On the other hand, the short fiber material has a higher contacting efficiency with the polishing slurry than the long fiber material. In this point of view, the short fiber material may be preferably used in the polishing step of wafer because the metallic ions under low concentration are intended to be removed. On the other hand, it is not required to remove the metallic ions under low concentration in the polishing step such as a CMP step for manufacturing devices. In this case, the concentration of the metallic ion in the polishing slurry becomes one hundred times as high as the one of the wafer polishing step so that the metallic ion burden for the chelate forming fibers is increased and thus, the chelate forming fibers must be exchanged frequently. In the polishing step such as the CMP step, therefore, the long fiber material may be preferably used because the long fiber material can be easily handled and processed.

In both cases, since all of the chelate forming functions fixed at the surface of the chelate forming fibers substantially trap the metallic ions, the metallic ion trapping ability becomes higher than a chelate resin.

The above-exemplified acidic functions may be partially converted into alkali metal salts or ammonium salts commensurate with the pH of the filtrate to be treated.

The polishing slurry refining material may be comprised of one or more of the above-exemplified materials. In the case where two or more refining materials are employed, the chelate forming ability of one refining material may be set different from the chelate forming ability of another refining material or the form of one refining material may be set different from the form of another refining material. In the latter case, the refining materials may be shaped in layered form, laminated form or composite form.

The refining material is concretely configured so as to be fixedly charged into a container to form one module. In this case, the chelate forming fibers may be shaped in sheet form or felt form and disposed in the flow path of the filtrate such that the filtrate can be passed through the sheet-shaped or felt-shaped chelate forming fibers. The used polishing slurry may be treated by the chelate forming fibers at a step prior to the polishing slurry concentrating step.

Alternatively, the short chelate forming fibers are charged into a container with an inlet and outlet for the filtrate so as to be movable therein. In this case, the short chelate forming fibers are stopped at a filter or strainer.

The concentration of each component and the composition of the polishing slurry under recovery are controlled by measuring them in the concentrated slurry, the filtrate and the recovered slurry continuously or intermittently.

Some scraps are removed from the polishing slurry under recovery with a metallic component-removing apparatus and/or a solid foreign substance-filter as occasion demands so that the polishing slurry can be recovered.

According to the present invention, the used polishing slurry containing a washing water is concentrated so that metallic components are removed from the thus concentrated filtrate, and the concentration of the concentrated filtrate of the used polishing slurry is controlled to a predetermined concentration. Therefore, the effective components contained in the concentrated filtrate (used polishing slurry) can be reused and no slurry waste is required to be treated.

BEST MODE FOR IMPLEMENTING THE INVENTION

Hereinafter, the present invention will be described in detail with reference to the drawings.

Figure 1:
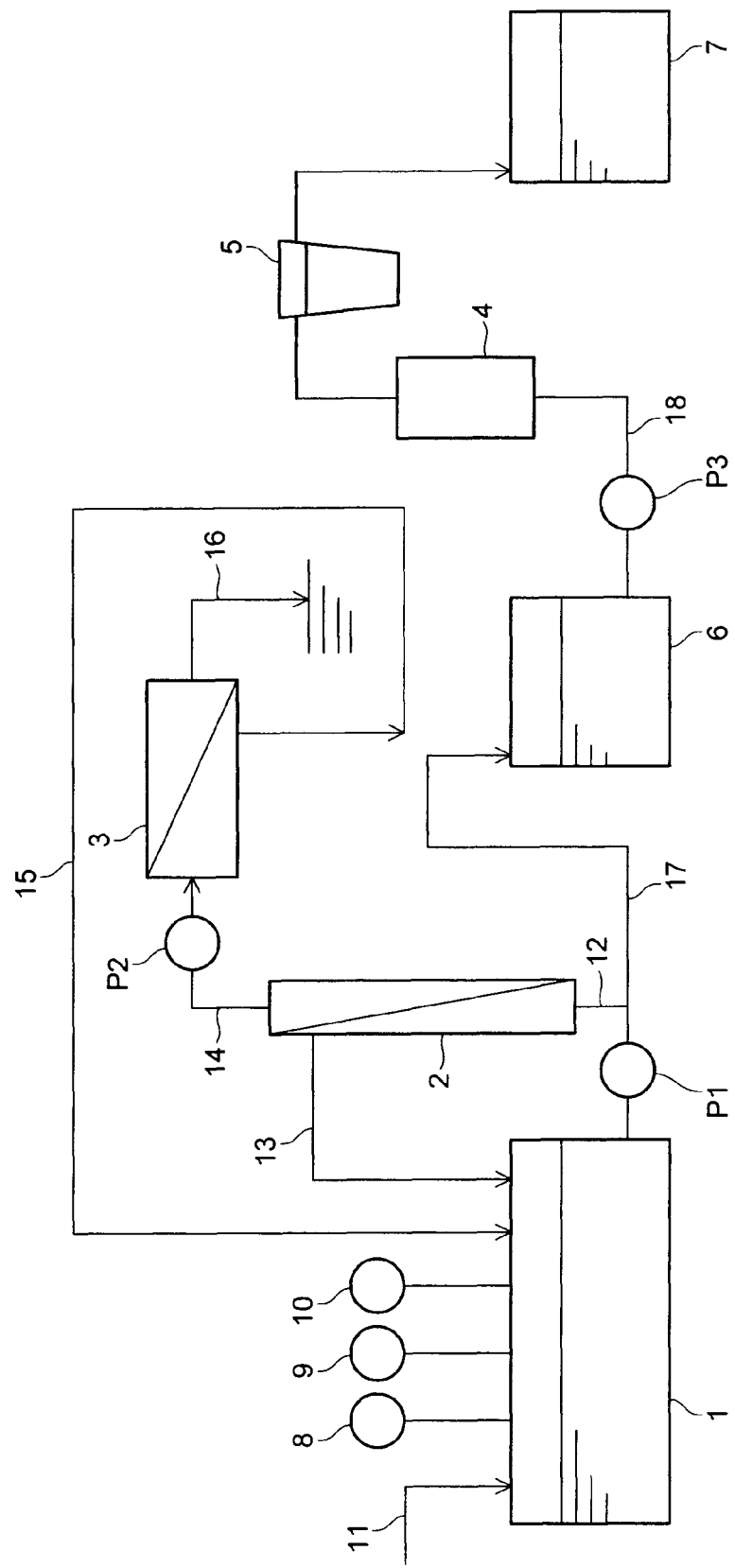
FIG. 1 is a structural view schematically showing an embodiment of the present invention.

FIG. 1 is a structural view schematically showing an embodiment of the present invention.

In the recovering system in this embodiment, a slurry tank 1 for feeding a used polishing slurry containing a washing water after polishing step, a ceramic filter (or acid resistive organic film) 2 with a pore diameter of 0.05 μm for removing the water component from the used polishing slurry and concentrating the used polishing water, a reverse osmosis membrane (RO) equipment 3 for treating the thus obtained filtrate at the ceramic filter 2, a metallic component-removing apparatus 4, a solid foreign filter 5, an intermediate tank 6 and a refining tank 7 are subsequently provided along the flow path of the polishing slurry under recovery.

In this embodiment, the used polishing slurry is supplied to the slurry tank 1 via a piping 11, and then, transferred to the ceramic filter 2 with a pump P1 via a piping 12. When the used polishing slurry is passed through the ceramic filter 2, the excess water of the used polishing slurry can be filtered so that the used polishing slurry can be concentrated. The concentrated used polishing slurry (hereinafter, often called as a "first concentration liquid") is transferred to the slurry tank 1 via a piping 13.

Then, the filtrate obtained at the ceramic filter 2 is pressurized with a pump p2 and transferred to the reverse osmosis membrane (RO) equipment 3. The thus obtained concentrated polishing slurry (hereinafter, called as a "second concentration liquid") at the RO equipment 3 is transferred to the slurry tank 1 via a piping 15. On the other hand, the filtrate passed through the RO equipment 3 is discharged via a piping 16.

A pH meter 8, a specific gravity meter 9 and a component concentration meter 10 are provided at the slurry tank 1 so that the pH value, the specific gravity and the component concentration of the polishing slurry can be measured. In this case, the above-described step is repeated to form the first concentration liquid and the second concentration liquid to be transferred into the slurry tank 1 until the pH value, the specific gravity and the component concentration of the polishing slurry in the slurry tank 1 can be set to respective predetermined values.

When the pH value, the specific gravity and the component concentration of the polishing slurry in the slurry tank 1 can be set to the respective predetermined values, the concentrated polishing slurry fed in the slurry tank 1 is transferred to the intermediate tank 6 with the pump P1 via a piping 17, and then, transferred to the metallic component-removing equipment 4 with a pump P3 so that some metallic components and metallic ions are removed from the concentrated polishing slurry.

Then, large scraps containing in the concentrated polishing slurry are removed at the solid foreign filter 5. Thereafter, the concentrated polishing slurry is transferred to the refining tank 7. As a result, the used polishing slurry is recovered and then, supplied to a polishing apparatus.

Not shown, a pH meter, a specific gravity meter and a component concentration meter may be provided at another tank and another equipment (apparatus). For example, if the component concentration, the pH value and the like are beyond the respective allowable ranges, the concentrating degree of the ceramic filter 2, the ratio of the supplying water to the discharging water at the RO equipment 3 and the like are controlled.

Figure 2:
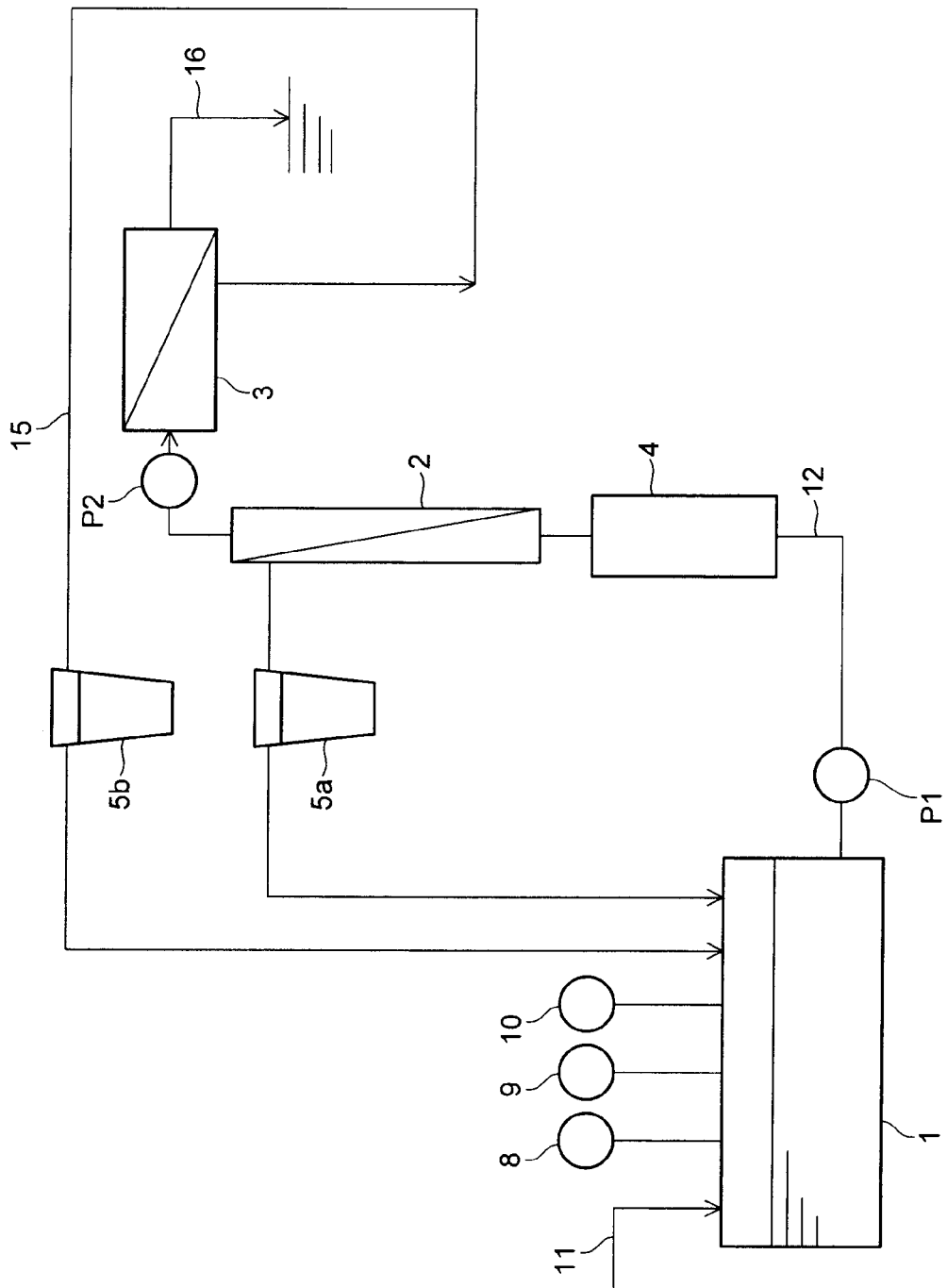
FIG. 2 is a structural view schematically showing another embodiment of the present invention.
Figure 3:
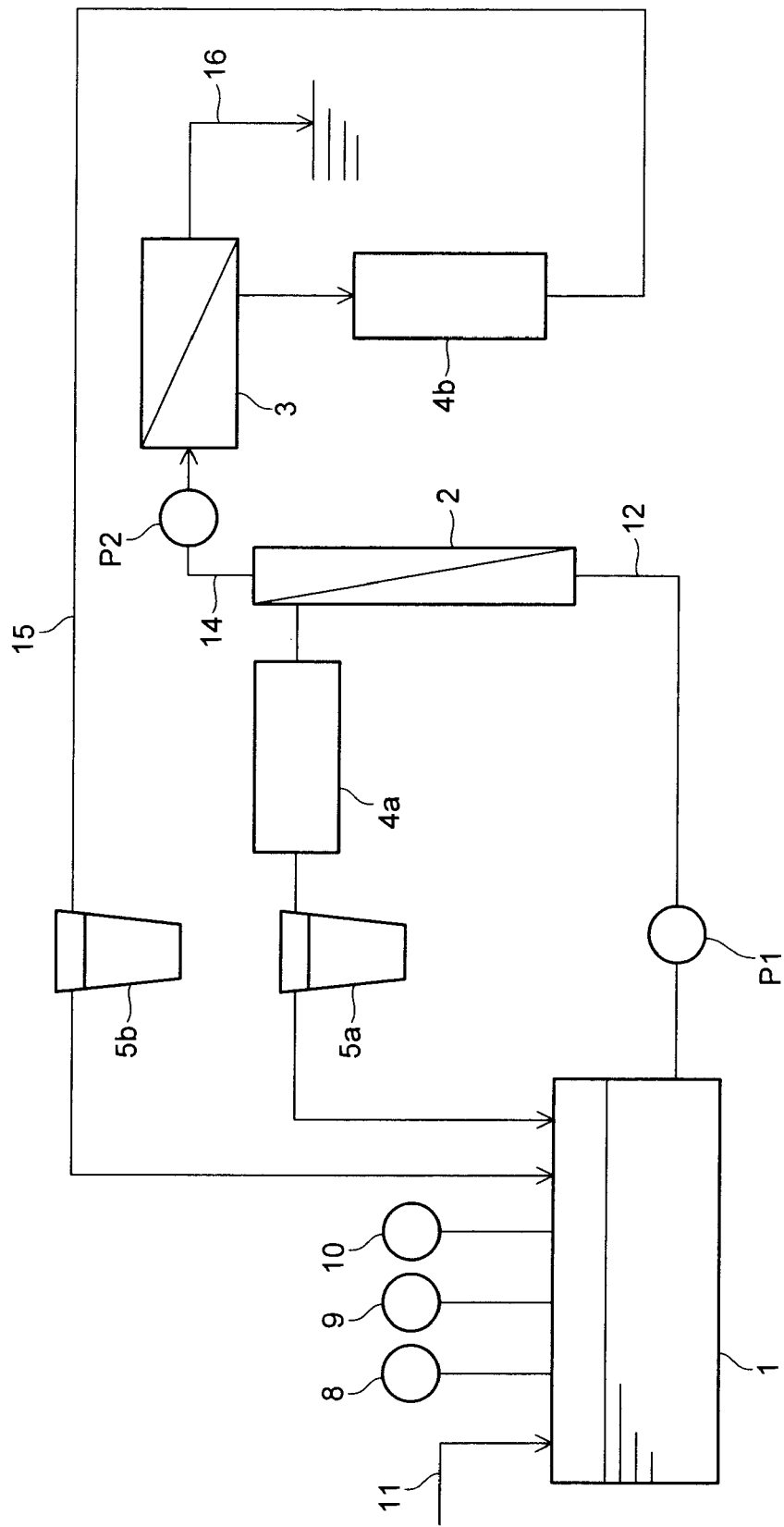
FIG. 3 is a structural view schematically showing still another embodiment of the present invention.

The systems shown in FIGS. 2 and 3 lack the intermediate tank 6 and the refining tank 7, respectively in comparison with the system shown in FIG. 1. In these cases, the recovering process for the used polishing slurry can be conducted in the same manner as described above relating to FIG. 1 except that the operations relating to the intermediate tank 6 and the refining tank 7 are not conducted.

In the recovering method of the used polishing slurry by the system shown in FIG. 2, the tungsten element and titanium element of the used polishing slurry are removed at the metallic component-removing apparatus 4 while the iron element are left, instead of that the first concentration liquid obtained at the ceramic filter 2 is directly transferred to the slurry tank 1 via the piping 13. Then, large scraps are removed from the polishing slurry under recovery at a first solid foreign filter 5a so that the polishing slurry is transferred to the slurry tank 1. Moreover, large scraps are also removed from the polishing slurry under recovery at a second solid foreign filter 5b so that the polishing slurry is transferred to the slurry tank 1, instead of that the second concentration liquid obtained at the RO equipment 3 is directly transferred to the slurry tank 1 via the piping 15.

In other words, since the large scraps of the first concentration liquid obtained at the ceramic filter 2 and the second concentration liquid obtained at the RO equipment 3 are removed at the solid foreign filters 5a and 5b in advance when the first concentration liquid and the second concentration liquid are transferred into the slurry tank 1, it is not required to provide the intermediate tank 6 and the refining tank 7 and then, transfer the concentrated polishing slurry to the solid foreign filter 5 for the removal of the large scraps contained therein. In the case of the use of the system shown in FIG. 2, it is not positively required to provide the intermediate tank 6 and the refining tank 7.

In the system shown in FIG. 3, a first metallic component-removing apparatus 4a and a second metallic component-removing apparatus 4b are incorporated in the system shown in FIG. 2. The first metallic component-removing apparatus 4a is provided between the ceramic filter 2 and the first solid foreign filter 5a. The second metallic component-removing apparatus 4b is provided between the RO equipment 3 and the second solid foreign substance filter 5b. In this embodiment, therefore, large scraps are removed from the polishing slurry under recovery at the first and second solid foreign filters 5a, 5b, and metallic components such as metallic particles and metallic ions are removed from the polishing slurry under recovery at the first and second metallic component-removing apparatuses 4a, 4b so that the polishing slurry is transferred to the slurry tank 1.

In other words, since the large scraps of the first concentration liquid obtained at the ceramic filter 2 and the second concentration liquid obtained at the RO equipment 3 are removed at the solid foreign filters 5a and 5b in advance while the metallic components such as the metallic particles and the metallic ions are removed at the metallic component-removing apparatuses 4a and 4b in advance when the first concentration liquid and the second concentration liquid are transferred into the slurry tank 1, it is not required to provide the intermediate tank 6 and the refining tank 7 and then, transfer the concentrated polishing slurry to the solid foreign filter 5 for the removal of the large scraps contained therein. In the case of the use of the system shown in FIG. 3, it is not positively required to provide the intermediate tank 6 and the refining tank 7.

In these embodiments, the used polishing slurry is concentrated and the metallic components of the concentrated polishing slurry are removed. However, the present invention is not limited to these embodiments.

Next, some examples concretized from the embodiments will be described.

EXAMPLE 1

The slurry waste (used polishing slurry) of a polishing agent to be used in a planarization process was recovered as follows. First of all, a ceramic filter made of an $Al_2O_3$ base and a $ZrO_2$ coating was prepared so that the water component and the silica abrasives of the polishing agent were separated with the ceramic filter. The pore diameter of the ceramic filter was set to 0.05 μm. The ceramic filter causes the increase of the abrasive density in the slurry waste. The circulating flow rate of the slurry waste for the ceramic filter was set to 4 m/sec so that about 35 L of the slurry waste can be filtered (treated) per one hour (namely, about 35 L of the filtrate can be obtained).

The thus obtained filtrate was transferred to a RO film (a polyamide film UTC-80 made by Toray Industries, Inc). In this case, the concentrating ratio (amount of supplied water/amount of concentrated water) was set to two.

The tungsten element and titanium element contained in the slurry waste were removed with a chelate forming fibers (example 2) and an ion exchanger (Example 3). As the chelate forming fibers were used the chelate forming fibers disclosed in JP-A 2003-074581 (KOKAI) and as the ion exchanger was used the "Duolite A202" made by "Rohm and Hass". The foreign substances such as pads and dressers occurring at the CMP step were removed with a filter (CMPure 205: about 50% of the foreign substances with respective sizes of 2 μm is removed and about 90% of the foreign substances with respective sizes of 5 μm is removed). The flow rate of the slurry waste was set to 1 L/min.

The slurry waste under recovery was sampled and analyzed in metallic concentration by means of ICP-AES through the addition of hydrofluoric acid and nitric acid to the sampled solution and the subsequent heating of the sampled solution at a temperature within a range of 50 to 300° C. so as to remove the silica abrasives from the sampled solution.

The abrasive size distribution was measured by "HORIBA LA-920 (trade name) and the abrasive number was measured by "ParticleSizingSystem Accusizer-780" (trade name).

EXAMPLE 2

5 kg of chelate fiber (CG-50 (trade name)) was packed in a cylindrical container with a diameter of 150 mm and a length of 850 mm to form a chelate module. Then, the slurry waste was fed to the chelate module from the intermediate tank 6 at a rate of 0.3 L/min. The feeding rate of 0.3 L/min was determined in view of the selective removal of the iron element and the tungsten element contained in the slurry waste. The iron element was originated from an additive to the slurry waste and the tungsten element was originated from a substance to be polished. In this case, the tungsten element was removed while the iron element was left.

The results of the examples are listed in Table 1. The sample was named as follows. The sample obtained from the piping 11 was named as a "slurry waste", and the sample obtained from the piping 13 corresponding to the concentration line of the ceramic filter 2 was named as a "concentrated solution (1)". The sample obtained from the piping 15 corresponding to the concentration line of the RO equipment 3 was named as a "concentrated solution (2)" and the sample obtained from the intermediate tank 6 was named as a "concentrated solution (3)". The sample obtained from the outlet of the metallic component-removing apparatus 4 and treated in Example 2 was named as a "metal-removed solution (1) and the sample obtained from the outlet of the metallic component-removing apparatus 4 and treated in Example 3 was named as a "metal-removed solution (2). The sample obtained from the refining tank 7 and treated in Example 2 was named as a "recovered slurry (1)" and the sample obtained from the refining tank 7 and treated in Example 3 was named as a "recovered slurry (2)".

For comparison, the analyzed result of the nonused slurry was also listed in Table 1.

slurry and the concentration of TOC are not changed, the iron element and the TOC were passed through the ceramic filter 2.

It was also turned out that the abrasive component in the concentrated solution (2) was concentrated by the RO equipment 3 on the result of the concentrated solution (2) in view of that the particles within a range of 0.5 to 1.0 μm are beyond the lower detecting limit. Moreover, it was turned out that since the concentration of the iron element and the concentration of the TOC in the concentrated solution (2) were increased, the iron element and the TOC, passing through the ceramic filter 2, were trapped at the RO equipment 3 and thus, concentrated.

The components of the concentrated solution (3) except the foreign substances and impurities within a particle range of 0.5 μm or more and within a particle range of 1.0 μm or more originated from the CMP step, the tungsten element and the titanium element were almost equal to the components of the nonused slurry.

The components of the metal-removed solutions (1) and (2) except the foreign substances and impurities within a particle range of 0.5 μm or more and within a particle range of 1.0 μm or more originated from the CMP step were almost equal to the components of the nonused slurry.

It was confirmed that the components of the recovered slurries (1) and (2) were almost equal to the components of the nonused slurry.

When a wafer was polished by using the nonused slurry and the recovered slurry, the polishing characteristics such as

TABLE 1

| Sample | Slurry waste | Concentrated solution (1) | Concentrated solution (2) | Concentrated solution (3) | Metal-removed solution (1) | Metal-removed solution (2) | Recovered slurry (1) | Recovered slurry (2) | Nonused slurry |
|---|---|---|---|---|---|---|---|---|---|
| Specific gravity | 1.003 | 1.035 | 1.001 | 1.033 | 1.033 | 1.033 | 1.033 | 1.033 | 1.033 |
| pH | 3.0~3.2 | 3.0~3.2 | 2.3 | 2.3 | 2.3 | 2.3 | 2.3 | 2.3 | 2.3 |
| Average particle size (μm) | 0.15 | 0.15 | 0.15 | 0.15 | 0.15 | 0.15 | 0.15 | 0.15 | 0.15 |
| Particle number of 0.5 μm or more of particle size (number/ml) | $3 \times 10^6$ | $8 \times 10^6$ | ND | $8 \times 10^6$ | $7 \times 10^6$ | $8 \times 10^6$ | $5 \times 10^6$ | $7 \times 10^6$ | $6 \times 10^6$ |
| Particle number of 1.0 μm or more of particle size (number/ml) | $5 \times 10^5$ | $9 \times 10^5$ | ND | $9 \times 10^5$ | $3 \times 10^5$ | $3 \times 10^5$ | $2 \times 10^4$ | $2 \times 10^4$ | $2 \times 10^4$ |
| W Concentration (ppm) | 40~60 | 40~60 | <1 | 40~60 | <1 | <1 | <1 | <1 | <1 |
| Fe Concentration (ppm) | 6 | 6 | 54 | 60 | 60 | 60 | 60 | 60 | 60 |
| Ti Concentration (ppm) | 10 | 10 | <1 | 10 | <1 | <1 | <1 | <1 | <1 |
| TOC Concentration (ppm) | 16~23 | 16~23 | 400 | 220 | 220 | 220 | 220 | 220 | 220 |

It was turned out that the slurry waste (used slurry) was diluted ten times as the nonused slurry and the concentrations of the tungsten element and the titanium element originated from the substance to be polished were increased.

It was also turned out that the abrasive component in the concentrated solution (1) was concentrated by the ceramic filter 2 on the result of the concentrated solution (1) because the specific gravity of the concentrated solution (1) was increased. Moreover, it was turned out that since the concentration of the iron element as the additive to the polishing planarization, polishing rate and scratch number of the nonused slurry are almost equal to the polishing characteristics of the recovered slurry.

What is claimed is:
1. A method for recovering a used slurry from a polishing process, comprising the steps of:
   passing a polishing slurry through a microfiltration membrane or an ultrafiltration membrane to remove foreign substances which are not inherently contained in the polishing slurry in a first concentrate liquid and a produce a filtrate liquid;

transferring the filtrate to a reverse osmosis membrane to form a second concentrate liquid, wherein the second concentrate liquid comprises abrasive components, a solvent and an additive and form a polishing slurry component that is recycled back to the process.

2. The method as set forth in claim 1, further comprising the step of selectively removing the foreign substances from the first concentrate with at least one of an ion exchanger and a chelate forming material.

3. The method as set for in claim 1, wherein the foreign substance comprises at least one liquid selected from the group consisting of a liquid originated from a washing liquid for a substance to be polished, a metallic compound originated from a substance to be polished, large particles originated from a polishing pad and a dresser for conditioning the polishing pad and abrasive aggregates.

* * * * *